United States Patent [19]
Inoue et al.

[11] Patent Number: 5,481,454
[45] Date of Patent: Jan. 2, 1996

[54] SIGN LANGUAGE/WORD TRANSLATION SYSTEM

[75] Inventors: Kiyoshi Inoue, Tokyo, Japan; Masahiro Abe, Dublin, Ireland; Hirohiko Sagawa, Kokubunji, Japan

[73] Assignee: Hitachi, Ltd., Tokyo, Japan

[21] Appl. No.: 141,646

[22] Filed: Oct. 27, 1993

[30] Foreign Application Priority Data

Oct. 29, 1992 [JP] Japan .................................. 4-291105

[51] Int. Cl.⁶ ........................... G06F 15/38; G06G 7/60; H03K 17/94; H03M 11/00
[52] U.S. Cl. ................. 364/419.03; 341/20; 364/419.07; 364/419.11
[58] Field of Search .................. 364/419.02, 419.13, 364/419.11, 419.12, 419.03, 419.07; 382/1; 379/52, 93; 381/36; 341/20; 434/229

[56] References Cited

U.S. PATENT DOCUMENTS

| | | | |
|---|---|---|---|
| 4,414,537 | 11/1983 | Grimes | 340/365 R |
| 4,878,843 | 11/1989 | Kuch | 434/112 |
| 5,047,952 | 9/1991 | Kramer et al. | 364/513.5 |

FOREIGN PATENT DOCUMENTS

| | | | |
|---|---|---|---|
| 0586259 | 3/1994 | European Pat. Off. | |
| 4-51372 | 6/1978 | Japan . | |
| 2-144675 | 6/1990 | Japan . | |
| 3-186979 | 8/1991 | Japan . | |
| 4-134515 | 5/1992 | Japan | G06F 3/02 |
| 4-222014 | 8/1992 | Japan | G06F 3/02 |

OTHER PUBLICATIONS

"Gesture Description and Structure of a Dictionary . . ." Transactions of the Inst. of Elect. vol. J76–A, No. 9, Pub. Date Sep. 1993, Jun Ku.

"Gesture Coding and Gesture Dictionary for Nonverbal Interface" IEICE Transactions on Fundamentals of Elec. vol. E75–A, No. 2, Feb. 1992 Kurokawa.

"Workplace Concepts in Sign and Text. A Computerized Sign Lang. Dict" Western Penn. School for the Deaf, 1991.

"Gesture Recognition using Recurrent Neural Networks" Human Interface Laboratory, pp. 237–242, 1991, Murakami et al.

"Continuous Word Recognition Using Continuous DP", by Oka, the speech study Group of Acoustical Society of Japan, S78–20, 1978, pp. 145–152.

"Auditory Sense and Voices", by Miura, Institute of Electronics and Communication Engineers, 1980.

"Pattern Recognition and Learning Algorithms", Kamisaka et al, Bunichi Sogo Shppan, p. 91.

Hitachi news release of Aug. 31, 1992.

Article in the Yomiuri newspaper of Sep. 1, 1992.

Article in the Nikkei newspaper of Sep. 1, 1992.

Technical Report of IPSJ (Information Processing Society of Japan), vol. 90, No. 66, 90–CG–46, 46–6, Aug., 1990, pp. 37–42.

(List continued on next page.)

*Primary Examiner*—Gail O. Hayes
*Assistant Examiner*—Stephen R. Tkacs
*Attorney, Agent, or Firm*—Fay, Sharpe, Beall, Fagan, Minnich & McKee

[57] ABSTRACT

A sign language/word translation system can cope with the case where no word corresponding to a hand operation is found. The system includes a configuration for taking a countermeasure against the finding of a plurality of words corresponding to a hand operation. When a word corresponding to a hand operation is not found in a sign language word dictionary, a finger operation is input, a character corresponding to the finger operation is searched for in a manual alphabet pattern dictionary, and the character train thus obtained is found from a character word dictionary, thereby producing an appropriate word. Also, a plurality of words found from the sign language word dictionary are displayed as translation candidates, and the user inputs by a hand operation as to whether the translation candidate is appropriate or not. The translation candidate that has been decided to be appropriate is determined as the word resulting from the translation.

12 Claims, 14 Drawing Sheets

OTHER PUBLICATIONS

Technical Report of IPSJ (Information Processing Socity of Japan), vol. 90, No. 65, 90-CG-45, 45-5, Jul. 1990, pp. 1-8.
IEICE (The Institute of Electronics, Information and Communication Enigneerings), Fall Conference D-408, 1990, pp. 6-410.

"Proceedings of Conference on Human Factors in Computing System CHI '91", (1991), pp. 237-242.

"Neural Computer–Learnhing from Brains and Neurons", by Aihara, the Publication Department of Tokyo Electric College, 1988, pp. 93-128.

FIG. IA
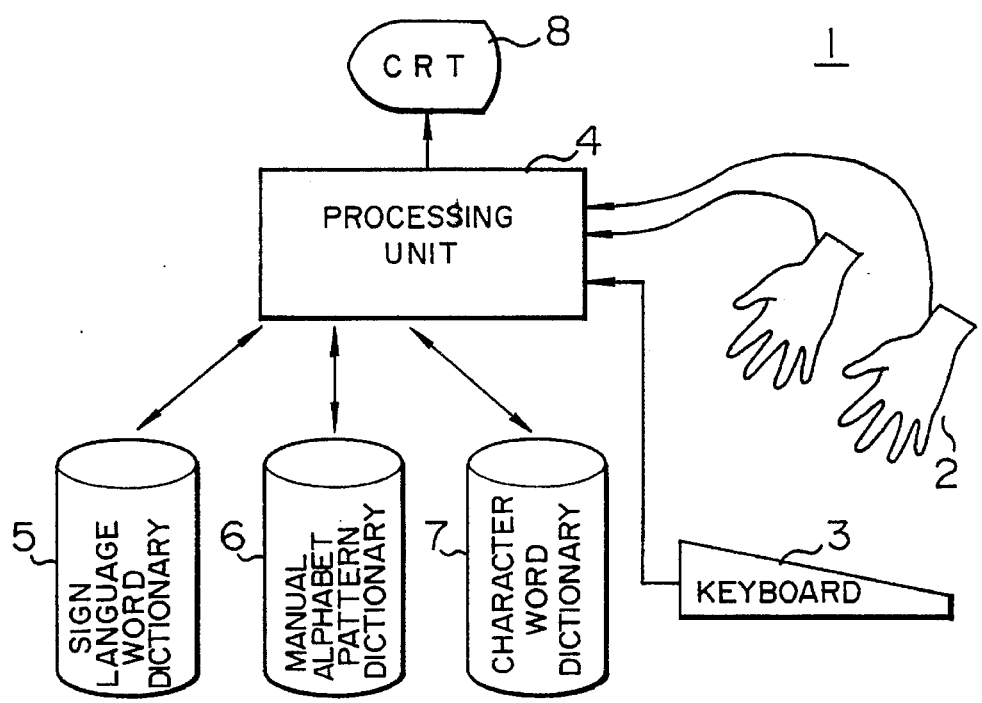
FIG. IB
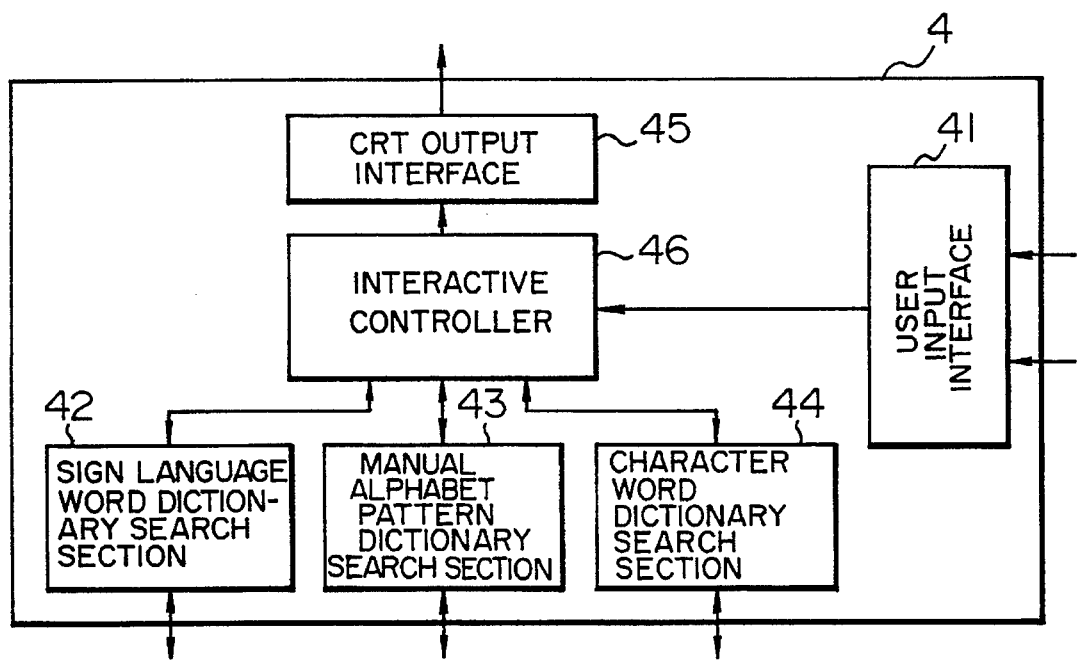

INPUT SIGN LANGUAGE

\* START WITH AND END AT HOME POSITION

: I

: PAY

: MONEY

:M

:O

:N

:E

:Y

FIG. 11A
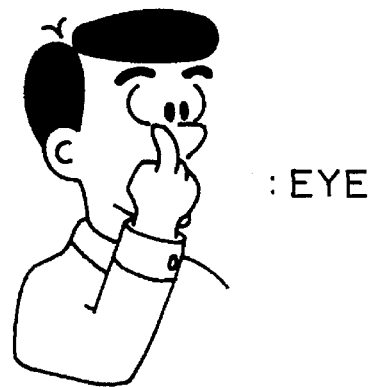
: EYE
FIG. 11B
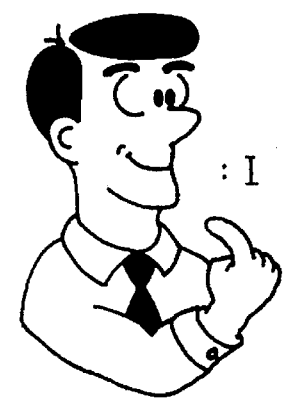
: I
FIG. 12
TRANSLATION RESULT
| EYE |
TRANSLATION OF FIRST WORD GOOD ?
RETRANSLATE ?

: NO GOOD

: NO

: MISTAKE

: OK

: YES

: RIGHT

LOWER THE CURSOR

RAISE THE CURSOR

NOTHING

SIGN LANGUAGE/WORD TRANSLATION SYSTEM

CROSS REFERENCE TO RELATED APPLICATION

The present application relates to (1) U.S. patent application Ser. No. 08/029,046, filed on Mar. 9, 1993, and entitled "Sign Language Translation System and Method", (2) U.S. patent application Ser. No. 08/111,380 of a continuation-in-part application of (1), filed on Aug. 24, 1993, entitled "Sign Recognition Apparatus and Method and Sign Translation System Using Same", and claiming the priorities based on Japanese patent applications (04-247285, Aug. 24, 1992; 04-235633, Sep. 3, 1992; and 04-051300, Mar. 10, 1992) by Hiroshi Sakou et al., and further (3) U.S. patent application Ser. No. 08/114,083, filed on Aug. 31, 1993, entitled "Sign-Language Learning System and Method", and claiming the priority based on Japanese patent application (4-235627, Sep. 3, 1992) by Masahiro Abe et al.

BACKGROUND OF THE INVENTION

The present invention relates to a sign language/word translation system, or more in particular to a sign language/word translation system capable of finger spelling input as well as hand operation input and/or capable of determining and retranslating of a word by hand operation.

The "Sign Language Translation System" disclosed in JP-A-4-134515 is known as one example of conventional sign language/word translation systems. The "Sign Language Translation System" translates a hand operation (motion of fingers, palms or arms) into a word of the sign language, displays it as a spelling on a screen or produces it as a voice output.

An apparatus for recognizing the motion of fingers, though not the sign language/word translation system, is disclosed in JP-A-2-144675. Also, there is disclosed a system for interpreting the finger motion as a finger spelling, displaying it on the screen and producing it as a voice.

In the above-mentioned sign language/word translation system (See JP-A-4-134515), words are registered for patterns of hand operation. When a hand operation is input, a word matching the particular hand operation is searched for. When strict conditions are imposed for matching, there may be a case where no word is found (translation impossible) or a translation error occurs. On the other hand, when the matching conditions become loose, a plurality of candidates for word translation may often be found. Thus, the hand operation is essentially ambiguous and it is impossible to determine the matching conditions properly. For this reason, there are many unavoidable cases where a word for the hand operation is not found, where a plurality of word translation candidates are found, and where a word, if found, is translated erroneously.

The conventional sign language/word translation systems described above have no configuration to cope with these inconveniences and have posed a practical problem. In the conventional system for interpreting a finger motion as a finger spelling (see JP-A-2-144675), on the other hand, normal successive hand operations cannot be recognized, thereby making it difficult to input the user's hand operations smoothly.

SUMMARY OF THE INVENTION

Accordingly, it is a first object of the invention to provide a sign language/word translation system having a configuration by which a case can be effectively coped with where a word corresponding to a hand operation cannot be found or where translation ends with an error.

A second object of the invention is to provide a sign language/word translation system having a configuration which effectively copes with a case where a plurality of words are found for a hand operation.

According to a first aspect of the invention, there is provided a sign language/word translation system comprising hand operation input means for inputting a hand operation, a sign language word dictionary in which words are registered for hand operations, sign language word search means for searching the sign language word dictionary for a word corresponding to the hand operation input from the hand operation input means, finger operation input means for inputting a finger operation when the word corresponding to the hand operation cannot be found in the sign language word dictionary, a manual alphabet pattern dictionary in which characters are registered for finger operations, manual alphabet search means for searching the manual alphabet pattern dictionary for a character corresponding to the finger operation input from the finger operation input means, a character word dictionary in which words are registered for character trains, and character train word search means for searching the character word dictionary for a word based on a character train obtained from the manual alphabet search means.

According to a second aspect of the invention, there is provided a sign language/word translation system comprising translation candidate presenting means for displaying one of a plurality of words searched from the sign language word dictionary as a translation candidate to input a hand operation indicating whether the translation candidate is appropriate or not, word determining means for determining the translation candidate as a word resulting from translation when the hand operation indicating that the translation candidate is appropriate is input through the hand operation input means, and presentation repeating means for removing the translation candidate and re-energizing the translation candidate presenting means when the hand operation indicating that the translation candidate is inappropriate is input through the hand operation input means.

According to a third aspect of the invention, there is provided a sign language/word translation system comprising translation candidate presenting means for displaying a plurality of words searched from the sign language word dictionary as a list of translation candidates, and for causing a user to select an appropriate one of the translation candidates by a hand operation, and word determining means for determining a translation candidate as an appropriate word resulting from the translation when the hand operation for selecting the translation candidate as the appropriate one is input through the hand operation input means.

In the sign language/word translation system according to the first aspect of the invention, when the word corresponding to the hand operation is not found in the sign language word dictionary, the finger operations are input, so that characters corresponding to the finger operations are searched for in the manual alphabet pattern dictionary, and the character word dictionary is searched for an appropriate word based on the character train thus obtained. In this way, since the finger spelling input of manual alphabets can be used as an aid to the hand operation input, even if there is any failure to find an appropriate word corresponding to the hand operation, the failure can be coped with, resulting in an increase of practicability.

In the sign language/word translation system according to the second aspect of the invention, one of the plurality of words searched for from in the sign language word dictionary is displayed as a translation candidate, and the user inputs a hand operation indicating whether the translation candidate is appropriate or not. When the hand operation indicating that the word is appropriate is input, the translation candidate is determined as a word resulting from the translation. When the hand operation indicating that the word is inappropriate is input, on the other hand, the translation candidate is deleted and another word is displayed as a translation candidate so that the user inputs a hand operation indicating appropriateness or inappropriateness of the translation candidate. This process is repeated until the most appropriate word is obtained. Since a word can be determined and retranslation can be designated by a hand operation, a countermeasure can be taken against the case where a plurality of words for one hand operation are found, thereby leading to an improved practicability.

In the sign language/word translation system according to the third aspect of the invention, when a plurality of words are found in the sign language word dictionary, they are displayed as a list of translation candidates so that the user selects an appropriate one of them by a hand operation. The translation candidate thus selected is determined as a word resulting from the translation, thereby obtaining the most appropriate word.

As described above, the most appropriate word can be selected by a hand operation from a plurality of words, and therefore the case of a plurality of words being found for a hand operation is coped with for an improved practical utility.

BRIEF DESCRIPTION OF THE DRAWINGS

FIG. 1A is a block diagram showing a configuration of a sign language/word translation system according to an embodiment of the invention;

FIG. 1B is a block diagram showing an internal configuration of the processing unit 4;

FIGS. 11A and 11B are diagrams showing two words which are likely to be found for a hand operation input;

FIG. 12 shows an example of the screen displaying a translation candidate;

DESCRIPTION OF THE PREFERRED EMBODIMENTS

Figure 2:
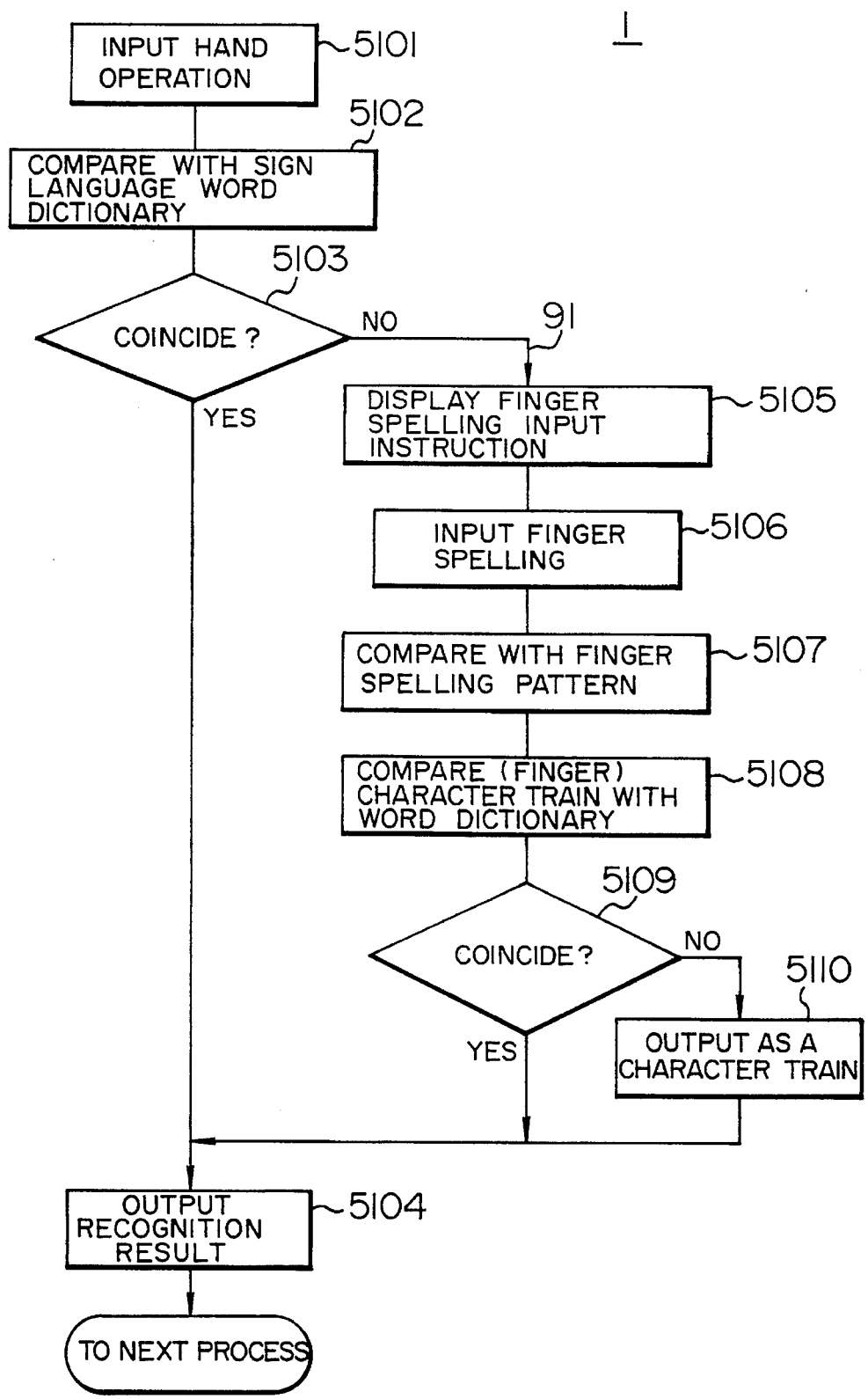
FIG. 2 is a flowchart showing the processes in the essential parts according to the first embodiment of the invention.

The invention will be described more in detail below with reference to the accompanying drawings. The following description including the accompanying drawings are not intended to limit the scope of the invention. The sign language used in the U.S.A. (ASL) will be employed for explanation, although the invention is applicable also to the sign languages in Britain, Japan and other countries.

[First embodiment]

FIG. 1A is a block diagram showing the configuration of a sign language/word translation system 1 according to a first embodiment of the invention. The sign language/word translation system includes Data Gloves (a trademark owned by U.S. VPL Research, Inc., hereinafter generically termed "data gloves") 2 which are a glove-like data input unit, a keyboard 3, a processing unit 4, a sign language word dictionary 5, a manual alphabet pattern dictionary 6, a character word dictionary 7 and a CRT 8. The data gloves 2 read the hand operations (motion of fingers, palms and arms) and the finger operations (motion of fingers and palms) by magnetic sensors and optical fiber sensors, which hand and finger operations are input to the processing unit 4. The data gloves 2 may be replaced by (or added to) a TV camera with equal effect.

The sign language word dictionary 5 has stored therein a multiplicity of words in correspondence with time series data representing the hand operation and rules for sign language. The manual alphabet pattern dictionary 6 has stored therein a multiplicity of characters in correspondence with manual alphabet patterns and rules for finger spelling. The character word dictionary 7 has stored therein a multiplicity of words in correspondence with character trains, and grammar.

As shown in FIG. 1B, the processing unit 4 includes a user input interface 41 for inputting the hand operation and finger operation through the data gloves 2 and inputting instructions through the keyboard 3, a sign language word dictionary search section 42 for searching for a word from the sign language word dictionary 5 based on the hand operation by use of a DP (Dynamic Programming) matching or a neural network, a manual alphabet dictionary search section 43 for searching for a character from the manual alphabet pattern dictionary 6 based on the static finger operation by use of a neural network or an ordinary pattern recognition method, a spelling word dictionary search section 44 for searching for a word from the character word dictionary 7 based on a character train by use of a language processing technique, a CRT output interface 45 for displaying an instruction to the user or a word searched for on the CRT 8, and an interactive controller 46 for controlling an interaction with the user and the operation of the whole process.

FIG. 2 is a flowchart showing the main operations for the sign language/word translation system 1. These operations are performed under control of the controller 46.

Figures 3, 4:
FIG. 3 is a diagram illustrating an example of displays for prompting the sign language input.
FIG. 4 is a diagram illustrating an example of the home position.
Figure 5A:
FIGS. 5A, 5B and 5C are diagrams showing input examples of sign language words.
Figure 5B:
Figure 5C:

Before entering the operation of the flowchart, the user inputs a hand operation of a sign language statement. FIG. 3 shows an example of a screen display on the CRT 8 for prompting the input of the sign language. FIG. 4 shows an example of the hand operation at HOME POSITION. Also, input examples of the U.S. sign language are shown in FIGS. 5A to 5C. In these diagrams, three successive hand operations "I PAY MONEY" are input.

At Step 5101 a hand operation is input by way of the data gloves 2. For a sign language of a plurality of successive hand operations, each hand operation is separated according to the rules of sign language, so that the hand operations are sequentially input one by one.

At Step 5102, a sign language word dictionary search section 42 searches the sign language word dictionary 5 for a word corresponding to one hand operation thus input. When a plurality of words are searched for a single hand operation, one with the highest coincidence degree is selected from among the words.

At Step 5103, whether or not the corresponding word is searched for is checked. In the case where the corresponding word is found, the process proceeds to step 5104. When no such word is found, by contrast, the process goes to step 5105. In this case, assuming that the first word "I" in the three hand operations shown in FIGS. 5A to 5C has been found, the process proceeds to step 5104.

Figure 6:
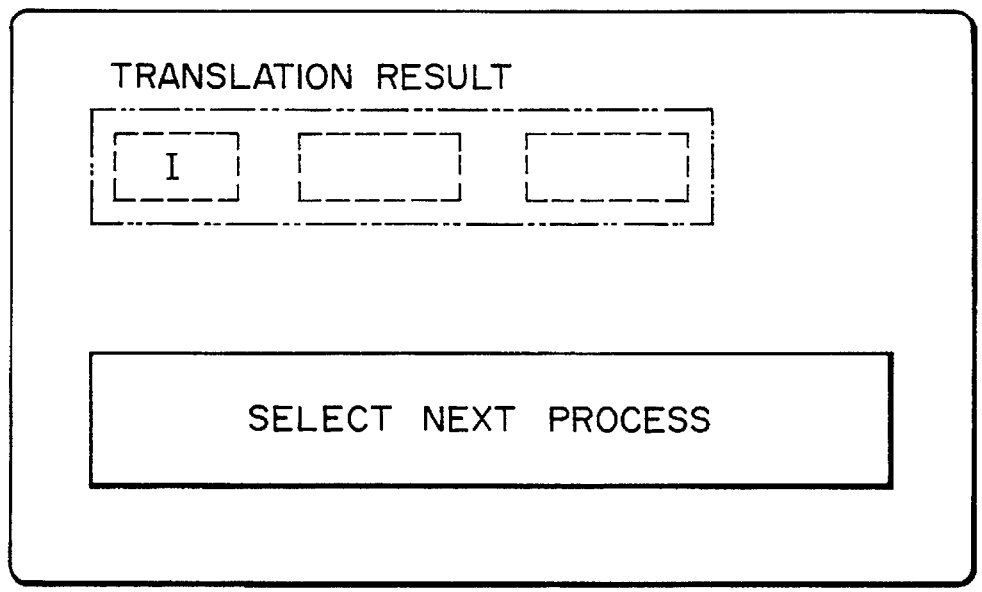
FIG. 6 is a diagram showing an example of the screen displaying a result of translation.

At Step 5104, an example of a screen as shown in FIG. 6 is displayed to the user to indicate the result of translation. Also, a display to the user is made to proceed to the "next process". The "next process" corresponds to steps 5101 to 5104, however, until the process for the last one of the series of hand operations is finished.

Now, assume that the second word "PAY" of the words for the three hand operations in FIGS. 5A to 5C has been found, but not the third word. The process proceeds from step 5103 to 5105, and then to step 91 constituting the finger spelling mode.

Figure 7:
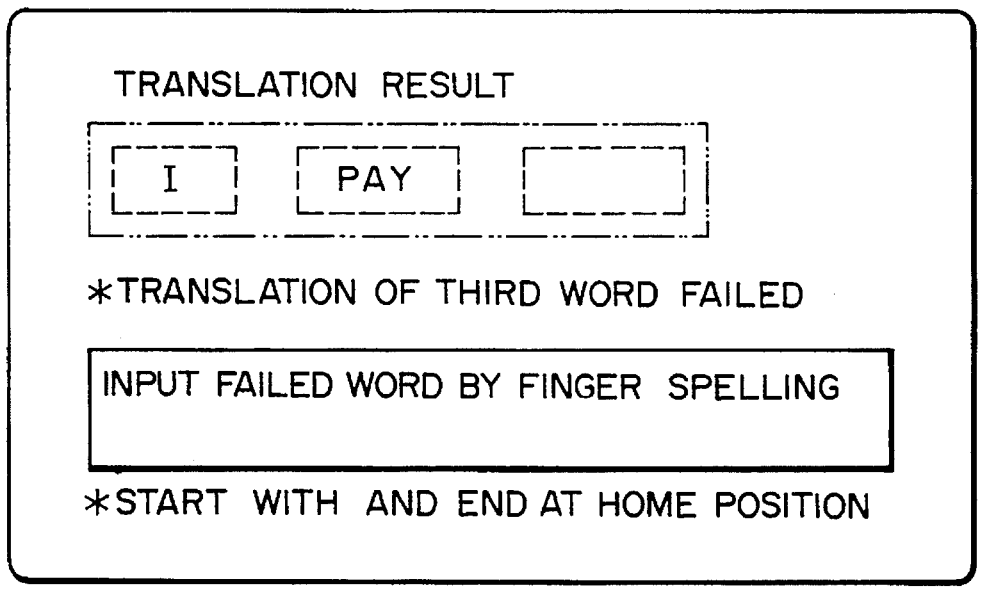
FIG. 7 is a diagram illustrating a display for prompting a finger spelling input of manual alphabets.
Figure 8A:
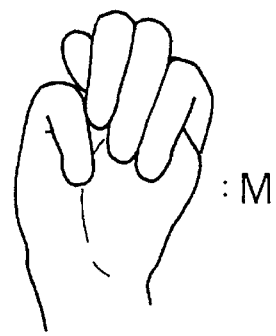
FIGS. 8A, 8B, 8C, 8D and 8E are diagrams showing input examples of manual alphabets.
Figure 8B:
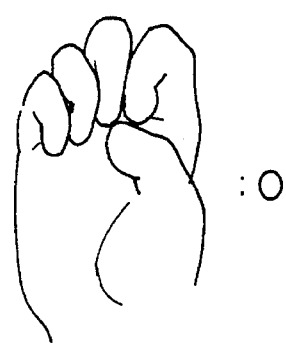
Figure 8C:
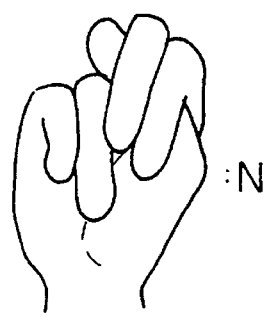
Figure 8D:
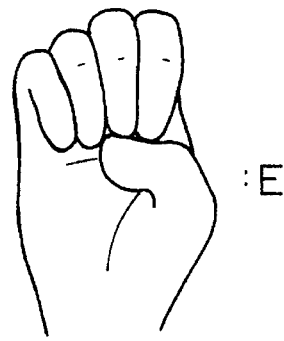
Figure 8E:
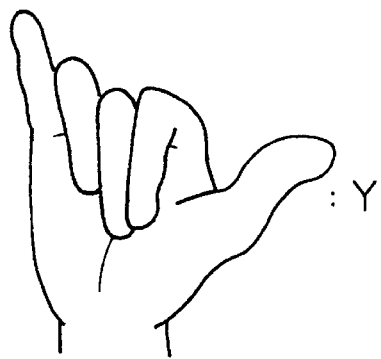

At Step 5105 an example of a screen as shown in FIG. 7 is displayed to prompt the user to input by finger spelling the word for which the search has failed. At Step 5106 the user inputs finger spellings by way of the data glove 2. FIGS. 8A to 8E show examples of input manual alphabet patterns. The five manual alphabet patterns have been input successively in the case under consideration.

At Step 5107, a series of manual alphabets or characters are divided into individual ones according to the manual alphabet rules, and a manual alphabet pattern dictionary search section 43 searches the manual alphabet pattern dictionary 6 for a character corresponding to each manual alphabet pattern. While the hand operation of the sign language is dynamic, the finger operation on finger spellings is static and the search is comparatively easy. By way of explanation, it is assumed that the five characters "M", "O", "N", "E" and "Y" corresponding to the five manual alphabet patterns shown in FIGS. 8A to 8E were found.

At Step 5108, a spelling word dictionary search section 44 searches the character word dictionary 7 for a word corresponding to the character train obtained at step 5107. At Step 5109, whether the corresponding word has been found is checked. In the case where the corresponding word is found, the searched word is additionally stored in the sign language word dictionary 5 as one word corresponding to the hand operation. The process then goes to step 5104. When a plurality of words corresponding to the character train are found, one of them having the highest coincidence degree is selected. In the case where there is not found any word corresponding to a character train, by contrast, the process proceeds to step 5110, and the character train is output not as a word but as is. In the case under consideration, the word "MONEY" corresponding to the five characters "M", "O", "N", "E" and "Y" is assumed to be found, and the process goes to step 5104.

Figure 9:
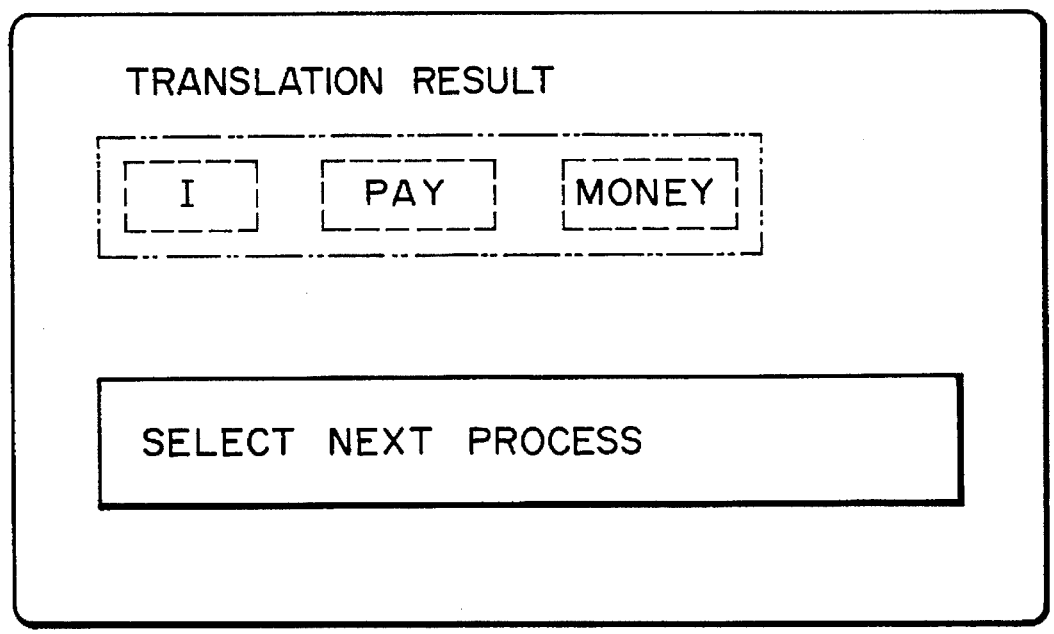
FIG. 9 shows an example of the screen displaying a final result of translation.

At Step 5104, an example of a screen as shown in FIG. 9 is displayed as the result of translation. In the process for the last one of the series of hand operations, a word omitted is complemented as required with reference to the grammar in the character word dictionary 7 to form a sentence. Also, a statement prompting the user to give an instruction on the "next step" is displayed. After the process for all of the series of hand operations is finished, the "next process" can be selected arbitrarily. The words omitted include articles and prepositions. Further, a verb having a directivity such as "GIVE", in which the noun of a subject or an object may be often omitted, is translated into a sentence with addition of an appropriate word.

In the process 91, in a finger spelling input mode, a finger spelling is input through the data glove, but, instead of the finger spelling, a finger operation writing a character in the air by a finger ("imaginary spelling") may be input. In that case, the manual alphabet pattern dictionary 6 shown in FIG. 1 is required to store patterns corresponding to the strokes of each finger operation for a character spelling.

Further, the "imaginary spelling" operation may be used in combination with the finger spelling or any one of the imaginary spelling and the finger spelling may be used as a means for recovery upon a translation failure.

According to the first embodiment, when a part of the sign language cannot be recognized, finger spelling can be used for the part and therefore the practicability of the sign language/word translation is improved. Also, since words of the unrecognized part are learned, the recognition rate of the sign language is automatically improved.

[Second embodiment]

The configuration of the sign language/word translation system according to a second embodiment of the invention is similar to that of the sign language/word translation system 1 according to the first embodiment. As a result, the block diagram showing the configuration is the same as that shown in FIGS. 1A and 1B. However, the contents of the processing unit 4 (especially, the operation of the interactive controller 46) are different.

Figure 10:
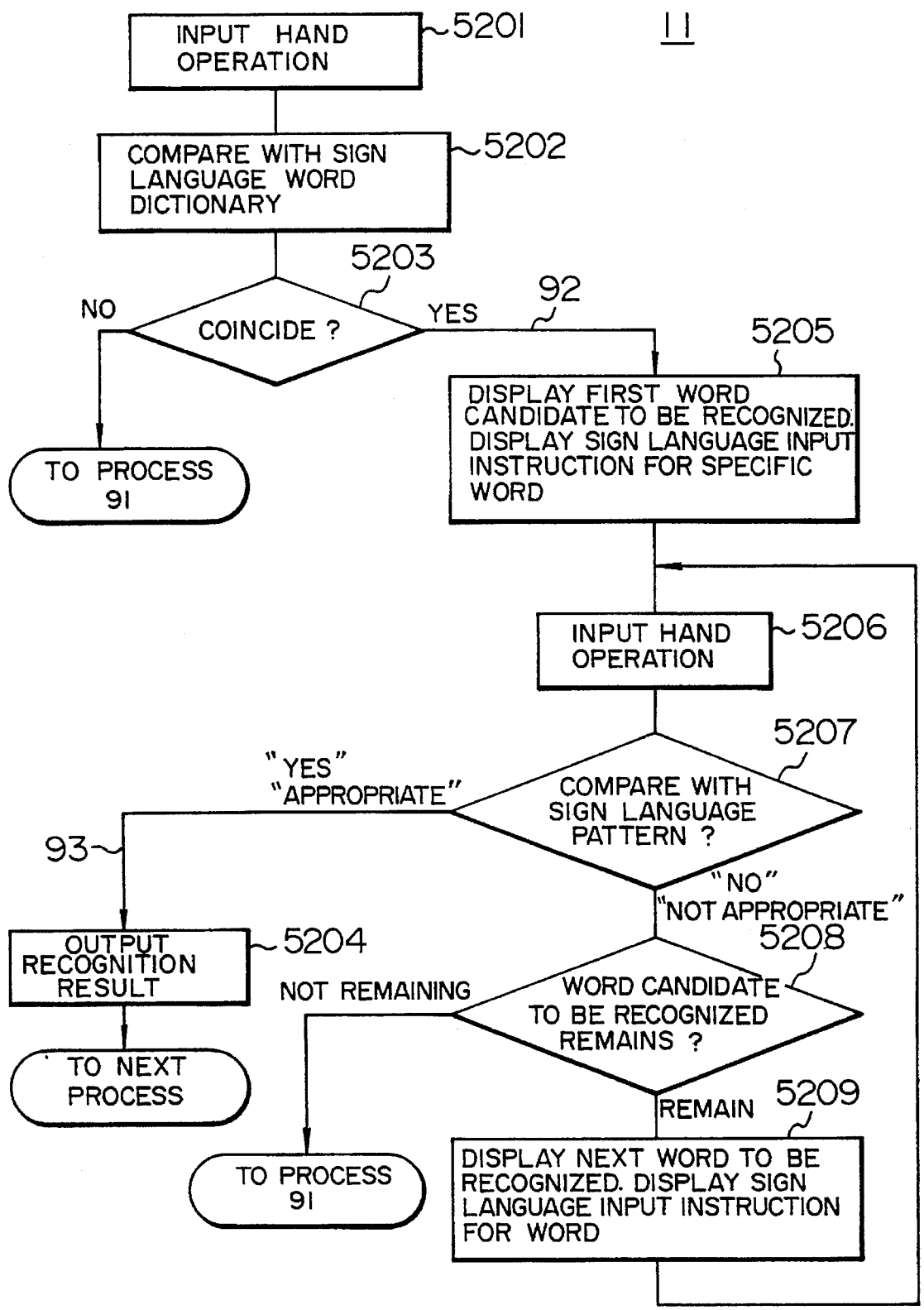
FIG. 10 is a flowchart showing the processes in the essential parts according to a second embodiment of the invention.

FIG. 10 shows the main operation of a sign language/word translation system according to the second embodiment.

At Step 5201 a hand operation is input by way of the data glove 2. For the sign language of a plurality of successive hand operations, each hand operation is divided according to the rules of the sign language and is input sequentially.

At Step 5202 the sign language word dictionary search section 42 searches the sign language word dictionary 5 for a word corresponding to each hand operation. When a plurality of words are found for a single hand operation, all the words are taken out. At Step 5203, whether any word corresponding to the hand operation was found is checked. When no such word was found, the process proceeds to the finger spelling input mode of the process 91 in FIG. 2. When there is any word found, by contrast, the process goes to step 5205. Assuming that there are found two words, "EYE" and "I", for the first hand operation, as shown in FIGS. 11A and 11B, the process proceeds to step 5205. (The hand operation for "I" may be performed in many cases to raise the right small finger like the manual alphabet of "I", but may be represented in some cases by the hand operation as shown in FIG. 11B.)

At Step 5205 one word as a translation candidate is displayed, as shown in FIG. 12, and the user is urged to input a specific hand operation indicating whether the translation candidate is appropriate or not.

Figure 13A:
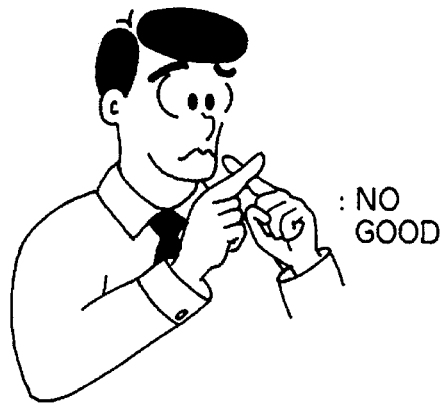
FIGS. 13A, 13B, 13C, 13D, 13E and 13F are diagrams showing examples of specific hand operations.
Figure 13B:
Figure 13C:

At Step 5206 the user is caused to input a specific hand operation. Some examples of hand operations are shown in FIGS. 13A to 13F. FIGS. 13A to 13C show expressions, "NO GOOD", "NG" and "MISTAKE" requiring retranslation, and FIGS. 13D to 13F "OK", "YES" and "RIGHT" expressions which are appropriate and may be determined. In addition to these expressions, several variations are preferably registered.

At Step 5207 the specific hand operation input through the data glove 2 is interpreted. In the case where retranslation is required as an inappropriate word, the process proceeds to step 5208. In the case where an expression is considered appropriate and may be determined, by contrast, the process proceeds to step 5204. Assuming that the hand operation indicating that the translation candidate "EYE" is not appropriate is input, the process is passed to step 5208.

Figure 14:
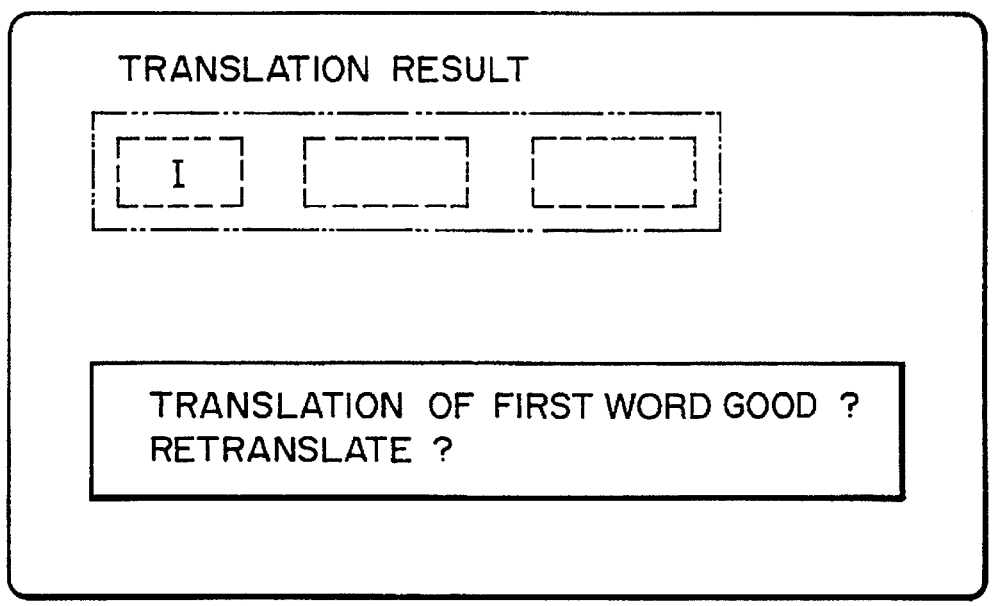
FIG. 14 is a diagram showing an example of the screen displaying a translation candidate.

At Step 5208 it is checked whether there still remains any word or not. In the case where any word remains, the process proceeds to step 5209. If there is no word remaining for recognition, on the other hand, the process is passed to the finger spelling input mode of 91 shown in FIG. 2. Since "I", which is a translation candidate in FIG. 11B, remains to be recognized, the process proceeds to step 5209. At Step 5209, as shown in FIG. 14, the next word is displayed as a translation candidate, and prompts the user to input the specific hand operation indicating whether the translation candidate is appropriate or not. The process then proceeds to step 5206, so that steps 5206, 5207, 5208 and 5209 are repeated.

Now, if the translation candidate "I" in FIG. 14 is appropriate, the process proceeds to step 5204 through steps 5206 and 5207. At Step 5204 an example of a screen as shown in FIG. 6 is displayed as the result of translation. Also, a display is made to prompt the user to designate the next process. Before completion of the processes for the series of hand operations, however, the "next process" corresponds to steps 5201 to 5204.

Figure 15:
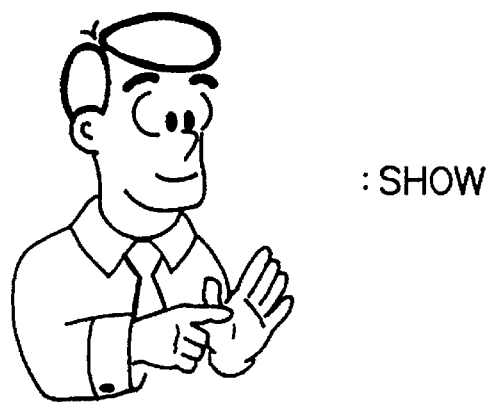
FIG. 15 is a diagram illustrating a word likely to be found for a hand operation input.

After the first word "I" for the first one of the three hand operations shown in FIGS. 5A to 5B is determined, assuming that a word of a translation candidate for the second hand operation is "SHOW" in FIG. 15, the process is passed from step 5203 to step 5205.

Figure 16:
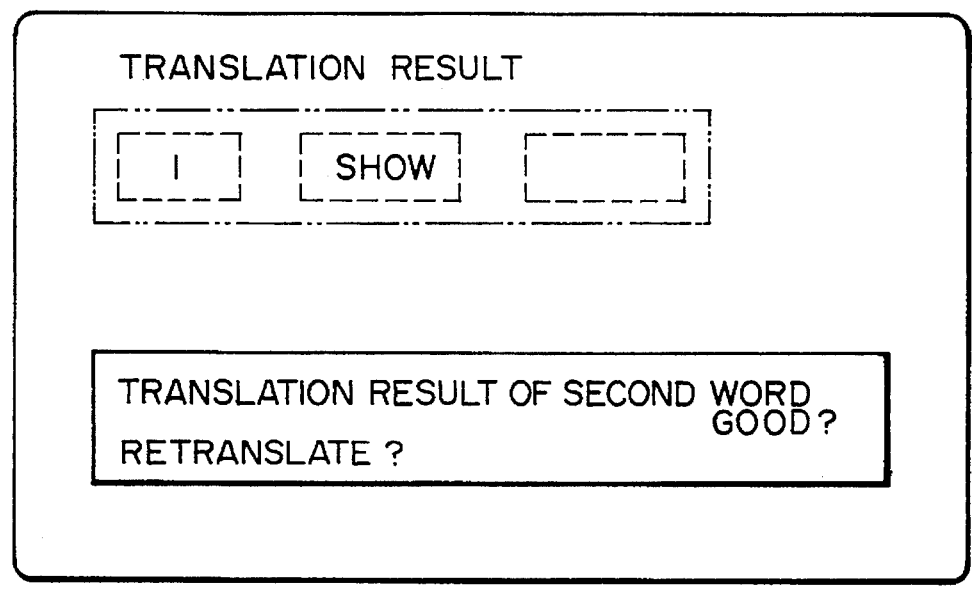
FIG. 16 shows an example of the screen displaying a translation candidate.

At Step 5205, as shown in FIG. 16, one of the words is displayed as a translation candidate, and prompts the user to input a specific hand operation indicating whether the translation candidate is appropriate or not. At Step 5206, when the user determines that the user has input a hand operation of "PAY", but the hand operation is translated to "SHOW" instead of "PAY" because of a translation error, the user inputs a specific hand operation by way of the data gloves 2. At Step 5207 the specific hand operation thus input is interpreted. Since a hand operation is input indicating that the translation candidate "SHOW" in FIG. 16 is not appropriate, the process is passed to step 5208.

At Step 5208 it is checked whether there still remains any word. Since no word remains to be recognized, the process proceeds to the finger spelling input mode of 91 in FIG. 2. Subsequent processes are similar to those shown in the first embodiment. If finger spellings are input as shown in FIGS. 8A to 8E, the result of translation shown in FIG. 9 is obtained.

According to the second embodiment described above, an appropriate word can be selected by a hand operation from among a plurality of translation candidates, and therefore a proper measure can be taken against a plurality of words which may be found, thereby improving the practicability of sign language/word translation. Also, the selection of an appropriate word can be attained without using the keyboard 3 so that a superior operability can be obtained.

[Third embodiment]

According to a third embodiment of the invention, a plurality of translation candidates are displayed in a list on a window and offered to the user for selection by a hand operation.

Figure 17:
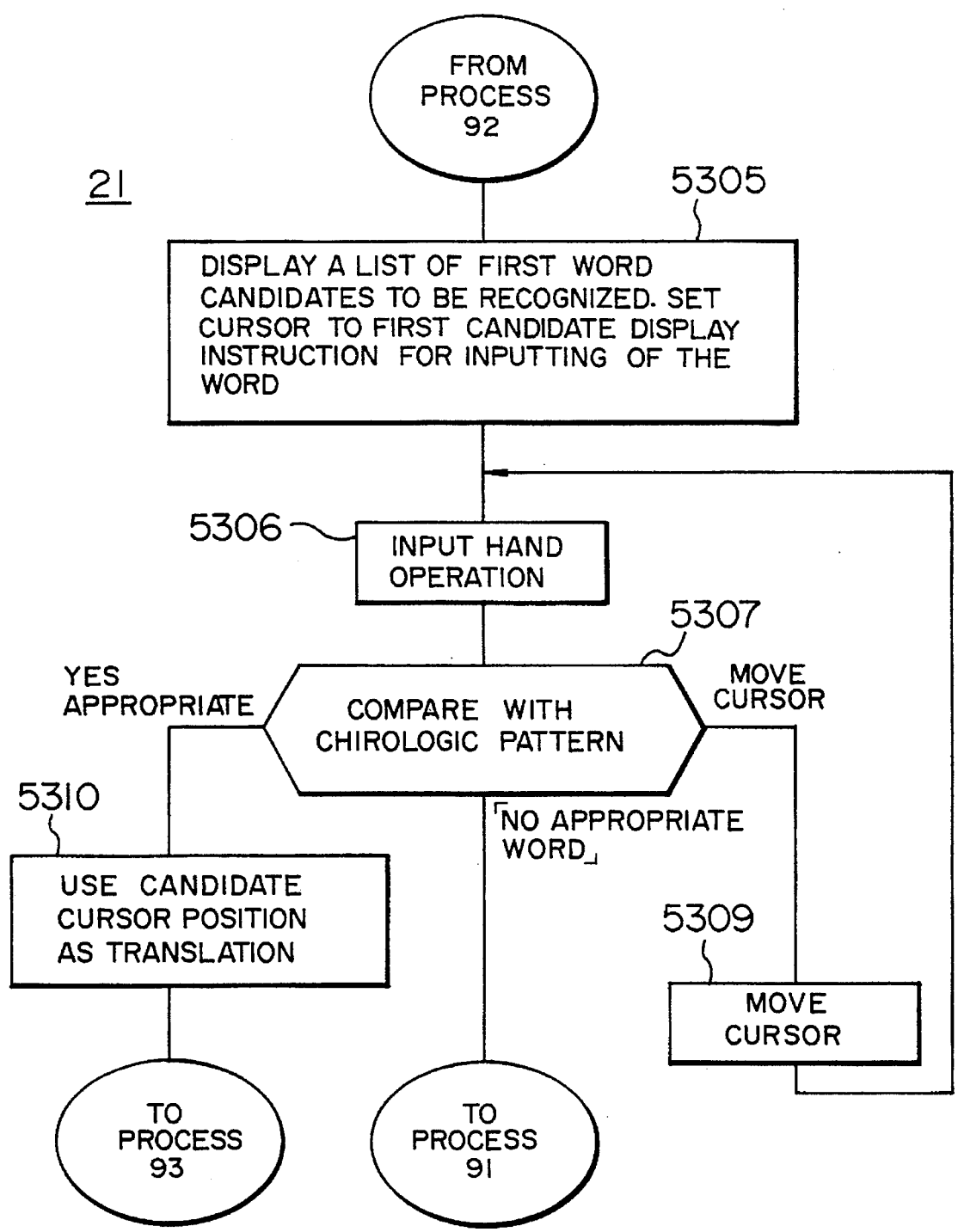
FIG. 17 is a flowchart showing the processes in the essential parts according to a third embodiment of the invention.

The configuration of the sign language/word translation system according to the third embodiment is similar to that shown in the block diagrams of FIG. 1 and the flowchart of FIG. 10. The only difference lies in that steps 5205 to 5209 of the processes 92 to 93 are replaced by steps 5305 to 5310 in FIG. 17.

Figure 13D:
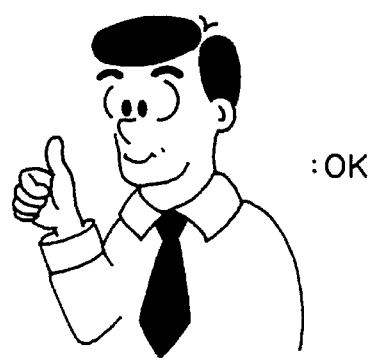
Figure 13E:
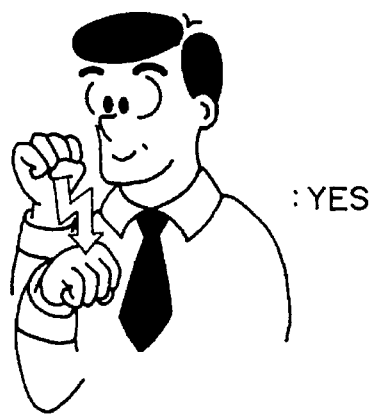
Figure 13F:
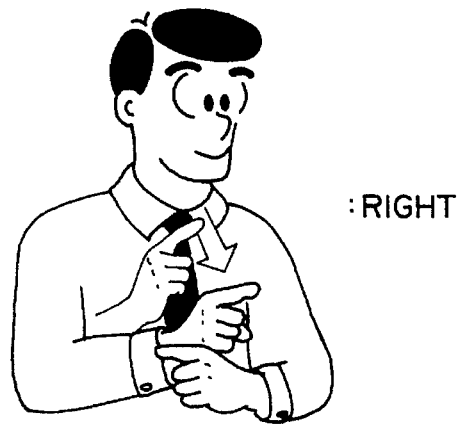
Figure 18:
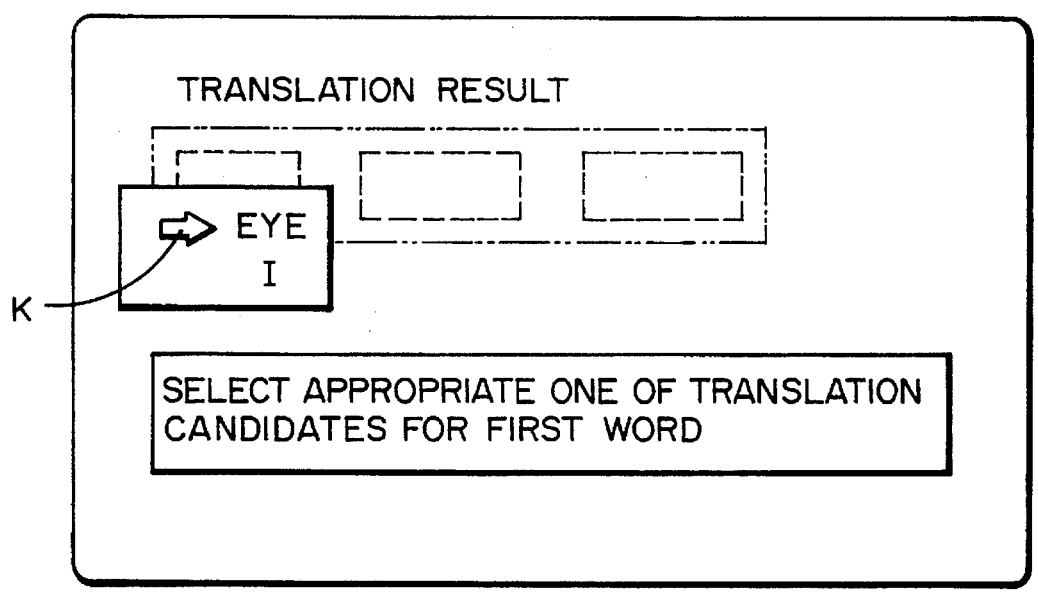
FIG. 18 is a diagram showing an example of the screen displaying a list of translation candidates.
Figure 19A:
FIGS. 19A, 19B and 19C are specific diagrams showing examples of a hand operation.
Figure 19B:
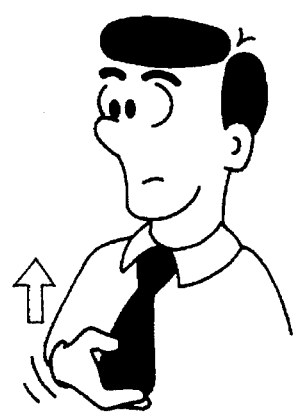
Figure 19C:

At Step 5305, as shown in FIG. 18, a list of translation candidates is displayed on the window and a cursor K is positioned at the first translation candidate. The user is prompted to input a specific hand operation indicating movement of the cursor K, if no appropriate word in the list or appropriateness of the translation candidate pointed to by the cursor K is determined. At Step 5306 the user inputs a specific hand operation. Some examples of specific hand operations are shown in FIGS. 19A to 19C. FIG. 19A indicates "LOWER THE CURSOR", FIG. 19B "RAISE THE CURSOR", and FIG. 19C "NO APPROPRIATE WORD IN LIST". The hand operations shown in FIGS. 13D to 13F are utilized to have the same meaning as "TRANSLATION CANDIDATE INDICATED BY CURSOR K IS APPROPRIATE". These and several other variations are desirably registered.

At Step 5307, the specific hand operation thus input is interpreted. For "LOWER THE CURSOR" or "RAISE THE CURSOR", the process proceeds to step 5309 to move the cursor K, and then returns to step 5306. With "NO APPROPRIATE WORD IN LIST", on the other hand, the process is passed to the finger spelling input mode of 91 in FIG. 2. Further, when the selection is "TRANSLATION CANDIDATE INDICATED BY CURSOR K IS APPROPRIATE", the process proceeds to step 5310, the translation candidate pointed to by the cursor K is determined as a word, and the process is passed to 93 in FIG. 10.

According to the third embodiment, as described above, an appropriate word can be selected by hand operations from a plurality of translation candidates, and therefore the case of a plurality of words being undesirably found is effectively coped with, thus improving the practicability of the sign language/word translation. Also, the fact that a proper word can be selected without using the keyboard leads to a superior operability.

Furthermore, as in the case of word selection described above, selection of a sentence, a document or a dictionary and designation of other system operations are made possible by a specific hand operation.

In a sign language/word translation system according to the present invention, a finger spelling can be used as an auxiliary input. In the case where no word corresponding to a hand operation can be found, therefore, a proper measure can be taken for an improved practicability of the sign language/word translation. Also, since an appropriate word can be selected by hand operations from a plurality of translation candidates, the case of a plurality of words being found can be coped with effectively, thereby improving the practicability of the sign language/word translation.

As a consequence, according to the present invention, a superior man-machine interface is provided, in which even users not accustomed to the operation of the keyboard or the like are able to take an appropriate measure against such cases as impossible translation or translation error and to determine an appropriate word from a plurality of translation candidates simply by a series of hand operations.

We claim:

1. A sign language/word translation computer system for translating a sign language motion into a verbal language representation thereof, comprising:

hand operation input means for converting a sign language hand operation into a signal representative thereof;

means including a sign language word dictionary memory for storing words corresponding to sign language hand operations;

means for pattern matching contents of said sign language word dictionary memory to recognize a word corresponding to a hand operation signal from said hand operation input means;

finger operation input means for converting a sign language finger operation into a finger operation signal when the word corresponding to the hand operation signal is not found in the sign language word dictionary memory;

means including a manual alphabet pattern dictionary memory for storing characters corresponding to sign language finger operations;

manual alphabet pattern recognition means for pattern matching contents of said manual alphabet pattern dictionary memory to recognize a character corresponding to each finger operation signal from said finger operation input means;

means including a character word dictionary memory for storing words corresponding to trains of said characters of said manual alphabet pattern dictionary memory; and character train word pattern recognition means for pattern matching contents of said character word dictionary memory for a word based on a train of characters searched by said manual alphabet pattern recognition means.

2. A sign language/word translation computer system according to claim 1, further comprising learning means for receiving the word found in said character word dictionary memory by said character train word pattern recognition means, and for storing the found word in said sign language word dictionary memory in correspondence with a corresponding hand operation.

3. A sign language/word translation computer system according to claim 1, wherein said character train word pattern recognition means includes means for outputting the character train as it is when the word corresponding to the character train is not found in said character word dictionary memory.

4. A sign language/word translation computer system according to claim 1, wherein said finger operation input means includes means for inputting a sign language finger operation of writing a character in the air by a finger when the word corresponding to the hand operation is not found in the sign language word dictionary memory.

5. A sign language/word translation computer system according to claim 1, further comprising:

translation candidate presentation means for displaying one of a plurality of words found in said sign language word dictionary memory as a translation candidate and inputting by a hand operation whether the translation candidate is appropriate;

means for determining the translation candidate as a word resulting from translation when a hand operation indicating the appropriateness of the translation candidate is input through said hand operation input means; and means for deleting a translation candidate and re-energizing the translation candidate presentation means when a hand operation indicating the inappropriateness of the translation candidate is input through said hand operation input means.

6. A sign language/word translation computer system according to claim 1, further comprising:

translation candidate presentation means for displaying a plurality of words as a list of translation candidates and having the user select an appropriate one of the translation candidates by hand operation when said words are found in said sign language word dictionary memory; and means for determining an appropriate translation candidate as a word resulting from translation when the hand operation for selecting said translation candidate is input through the hand operation input means.

7. An automated machine-implemented sign language/word translation method for translating a sign language motion into a verbal language representation thereof, comprising the steps of:

converting a sign language hand operation into an electrical signal representative thereof;

storing words corresponding to sign language hand operations in a sign language word dictionary memory;

pattern matching contents of said sign language word dictionary memory to recognize a word corresponding to a hand operation electrical signal generated by said step of converting a sign language hand operation into an electrical signal;

converting a sign language finger operation into a finger operation electrical signal when the word corresponding to the hand operation electrical signal is not found in the step of pattern matching contents of the sign language word dictionary memory;

storing characters corresponding to sign language finger operations in a manual alphabet pattern dictionary memory;

pattern matching contents of said manual alphabet pattern dictionary memory to recognize a character corresponding to each finger operation electrical signal generated by said step of converting a sign language finger operation into a finger operation electrical signal;

storing words corresponding to trains of said characters of said manual alphabet pattern dictionary memory in a character word dictionary memory; and pattern matching contents of said character word dictionary memory to recognize a word based on a train of characters determined by said step of pattern matching contents of said manual alphabet pattern dictionary memory.

8. An automated machine-implemented sign language/word translation method as claimed in claim 7, further comprising the steps of receiving the word found in said character word dictionary memory, and storing the found word in said sign language word dictionary memory in correspondence with a corresponding sign language hand operation.

9. An automated machine-implemented sign language/word translation method as claimed in claim 7, wherein said step of pattern matching contents of said character word dictionary memory includes a step of outputting the train of characters pattern-matched in said step of pattern matching contents of said manual alphabet pattern dictionary memory, when the word corresponding to the character train is not found in said character word dictionary memory.

10. An automated machine-implemented sign language/word translation method as claimed in claim 7, wherein said step of converting a sign language finger operation into a finger operation electrical signal includes the step of inputting a sign language finger operation of writing a character in the air by a finger when the word corresponding to the hand operation is not found in the sign language word dictionary memory.

11. An automated machine-implemented sign language/word translation method as claimed in claim 7, further comprising the steps of:

displaying one of a plurality of words found in said sign language word dictionary memory as a translation candidate and inputting by a hand operation whether the translation candidate is appropriate;

determining the translation candidate as a word resulting from translation when a hand operation indicating the appropriateness of the translation candidate is converted in said step of converting a sign language hand operation into an electrical signal representative thereof; and deleting a translation candidate and repeating the step of displaying one of a plurality of words when a hand operation indicating the inappropriateness of the translation candidate is converted in said step of converting a sign language hand operation into an electrical a signal representative thereof.

12. An automated machine-implemented sign language/word translation method as claimed in claim 7, further comprising the steps of:

displaying a plurality of words as a list of translation candidates and having a user select an appropriate one of the translation candidates by a hand operation when said words are found in said sign language word dictionary memory; and determining an appropriate translation candidate as a word resulting from translation when the hand operation for selecting said translation candidate is converted in said step of converting a sign language hand operation into an electrical signal representative thereof.

* * * * *